United States Patent [19]

Forssberg et al.

[11] 4,126,433
[45] Nov. 21, 1978

[54] METHOD OF AND APPARATUS FOR REMOVING AEROSOLS OF HYDROCARBONS FROM A GAS STREAM

[76] Inventors: Knut S. E. Forssberg, Lagmansvägen 7, S-950 10 Gammelstad; Karl D. Kopp, Cedervägen 25, S-18010 Enebyberg, both of Sweden

[21] Appl. No.: 731,343

[22] Filed: Oct. 12, 1976

[30] Foreign Application Priority Data

Oct. 9, 1975 [SE] Sweden ............................... 7511363

[51] Int. Cl.² .............................................. B01D 53/04
[52] U.S. Cl. .......................................... 55/74; 55/98; 55/387; 55/524
[58] Field of Search ..................... 55/74, 98, 512, 518, 55/524, DIG. 16, 387; 210/DIG. 26

[56] References Cited

U.S. PATENT DOCUMENTS

| 1,660,642 | 2/1928 | Barnebey | 55/74 |
| 2,858,902 | 11/1958 | Cottle | 55/74 |
| 3,274,103 | 9/1966 | Adams | 210/DIG. 26 |
| 3,629,998 | 12/1971 | Takehisa | 55/74 |
| 3,686,827 | 8/1972 | Haigh et al. | 55/74 |
| 3,805,493 | 4/1974 | Kennedy et al. | 55/74 |
| 3,905,783 | 12/1975 | Winter | 55/74 |
| 3,997,467 | 12/1976 | Jederström | 210/DIG. 26 |

FOREIGN PATENT DOCUMENTS

| 1,419,244 | 10/1968 | Fed. Rep. of Germany | 55/74 |
| 1,357,817 | 3/1964 | France | 55/524 |

*Primary Examiner*—Frank W. Lutter
*Assistant Examiner*—David L. Lacey
*Attorney, Agent, or Firm*—Michael J. Striker

[57] ABSTRACT

Liquid aerosol particles of hydrocarbons or hydrocarbon derivatives are removed from a gas stream in which they are suspended, by passing the gas stream through a bed of crystalline grains having a size of about 0.5–2.0 mm and whose surfaces are coated with a lipophilic substance. During this passage the hydrocarbons or derivatives thereof are adsorbed on the lipophilic surfaces of the grains and the gas is thereby rendered at least substantially free of the hydrocarbons or derivatives thereof.

9 Claims, 3 Drawing Figures

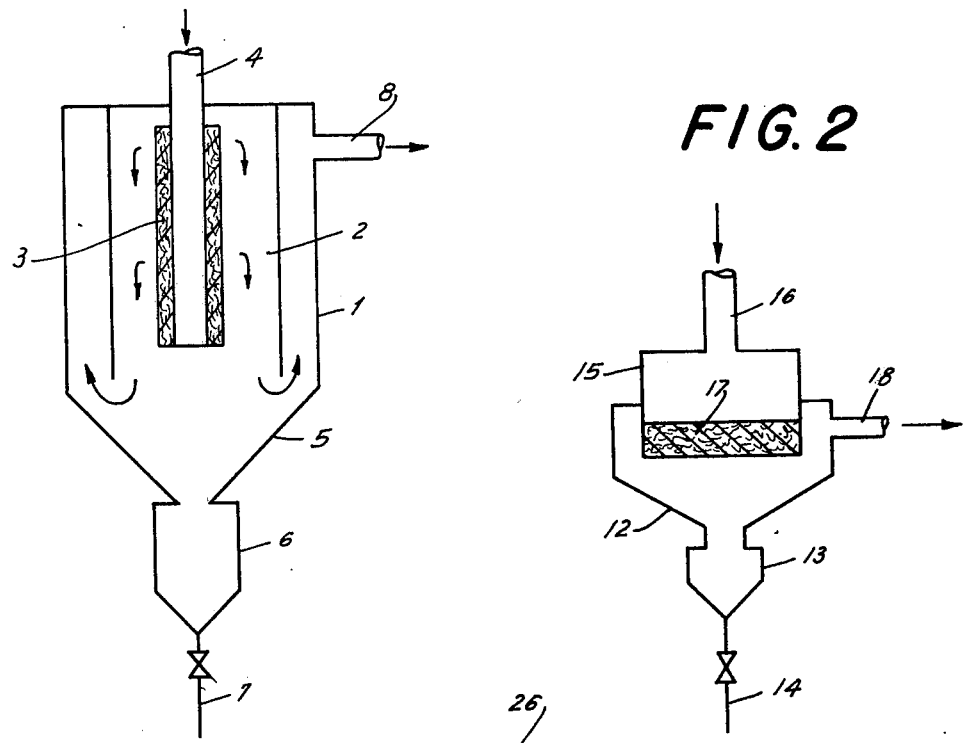
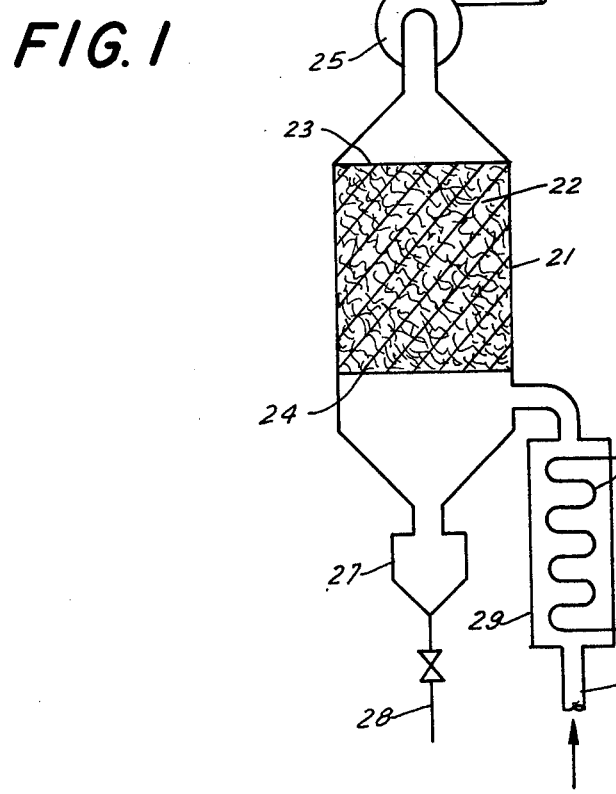
FIG. 1
FIG. 2
FIG. 3

METHOD OF AND APPARATUS FOR REMOVING AEROSOLS OF HYDROCARBONS FROM A GAS STREAM

The present invention relates to a method of and apparatus for removing liquid aerosol particles of hydrocarbon from a gas. An aerosol is a dispersion of solid or liquid particles in a gas. The present invention pertains particularly to a dispersion of liquid particles in air, and more particularly, to a dispersion of hydrocarbons or hydrocarbon derivatives in air. The aerosol of the present invention includes an organic compound in the form of fluid a hydrocarbon or a derivative thereof. An example is oil fog used in lubricating a machine. Other examples of fluid hydrocarbons are the type of solvents used in paints and lacquers. Further examples are the chlorinated hydrocarbons, e.g. trichloroethylene often used as a degreaser.

SUMMARY OF THE INVENTION

It is an object of the present invention not only to recover organic fluids, which would otherwise be lost, but also to prevent organic matter from being released into the free air where it contaminates the environment, indoors and outdoors.

The method according to the present invention is characterized in that the the gas is directed against a filter consisting of a porous medium furnished with a lipophilic surface. Liquid hydrocarbons and hydrocarbon derivatives are separated from the gas stream as the gas stream passes through the filter. The hydrocarbons, or their derivatives are adhered on the lipophile surfaces to form a thin liquid film.

As a filter medium we prefer to use a granular mineral, the grains of which have a size of approximately 0.5–2.0 mm, and which are coated with a lipophilic surface. The granular material consists preferably of a crystalline, monophase mineral. Suitable materials are quartz, iron pyrites, hematite ($Fe_2O_3$) and magnetite ($Fe_3O_4$). We prefer to use magnetite as it can easily be delivered in a homogenous, pure form. The granular material is ground to the actual grain size (mesh), whereby too fine and too large particles are rejected, preferably by sieving.

In order to have a perfect functioning of the filter it is desirable to have a mainly homogenous pore size. This is obtained by using a mineral with mainly uniform granular size. Within the proposed range of grain sizes, 0.5–2.0 mm, we prefer to make use of an even closer fraction of grain-sizes. We prefer that in each specific filter the difference between the smallest and the largest grain-size is kept below 0.3 mm. The range of grain-sizes according to this proposed performance of the invention can thus vary between 0.5–0.8 and 1.7–2.0 mm. The choice of a range of grain sizes depends on the circumstances in the actual case. The mineral should at least have 95% of its weight within the desired grain size. Too fine filter material results in a too high resistance, and thereby causing two high a pressure drop, as the gas and a proportion of the non-hydrocarbon and non-hydrocarbon derivative particles of the aerosol streams through the filter medium. Grains which are too large reduce the active surface of the filter.

The treatment of the mineral in order to obtain the lipophilic surface is preferably made by treating the mineral with a substance whose molecules have a good adhesion to the mineral surface and at the same time have a lipophilic character. For hematite and magnetite it has proved that a dissociated fatty acid as e.g. pine oil can react with the surface ions of the mineral and by chemisorption produce a durable and lipophilic surface coating. This durable coating is caused by the reaction forming bonds between the grain surfaces and the lipophilic substance. These bonds are at least partially formed by chemisorbing the lipophilic substance onto the surfaces of the grains so as to produce bonds comparable in strength to ordinary chemical bonds and much stronger than Van der Waals bond which characterize physical adsorption. Alternatively it is possible to use the unsaturated fatty acids which form the basic constituent of pine oil, linoleic acid and olic acid. For quartz it is possible to use amines as a lipophilic substance, preferably an amine with a long chain, as e.g. dodecylacetamine, $C_{15}H_{25}CONH_2$. For iron pyrit preferably xanthates are used, as e.g. potassium amyl xanthate.

The lipophilic substance, eventually dissolved in a solvent, is mixed with the mineral, and the mixture is stirred so as to evenly coat the surfaces of the mineral. The lipophilic layer needs only to be approximately 0.1% of the diameter of the material. After the solvent has evaporated, the coated mineral is deposited into the filter container where it is packed together between two opposite walls of a porous material, a wire-mesh or equivalent, so as to form an incompressible bulk of material for the relevant pressures.

Another mineral that could be used is glass. The glass surface is in itself hydrophilic but can be made lipophilic by coating it with a thin layer of a wetting agent, e.g. alkylamine. The glass can be used in the form of grains or balls with the above mentioned grain size.

Another material that can be used are polymers. Most polymers show a lipophilic activity, e.g. polypropene, and it is therefore possible to use this material without any extra coating. The polymer can be used in the form of grains or balls as in the case of glass material mentioned above.

Organic matter is adsorbed as a thin film on the lipophilic surfaces. Any substantial increase in the aerodynamic resistance does not occur, at least not initially. After being in use for some time the filter can be regenerated. It is then preferably to make use of two filter beds, one being regenerated when the other is working. There are different methods proposed for regenerating the filter medium. The filter can be heated up whereby the organic compound distills. Another method is to blow the filter with pressurized air or with water vapor. In the last case the exhausted vapor mixture is forced to condense whereby the water and the insoluble substances therein can be separated gravimetrically.

According to one of the proposed performances of the present invention no regeneration of the filter is necessary. If the pores of the filter are large enough, the adhered organic matter spontaneously flows out of the filter because of the gravity when the thickness of the adhered film has reach a certain value. It is thus possible to run the filter continuously, with a continuous drain of adsorbed fluid.

The method according to the present invention can e performed at normal temperatures if the organic compound has a high boiling point, as in the case of oil fog for lubricating purposes. If the organic compound has a low boiling point, a certain part of the aerosol will be present in the air in the form of a gas. According to another proposed embodiment of the present invention the aerosol is cooled down to such a temperature that the main part of the organic matter is in droplets. The same technique can be used on a pure gas mixture, e.g. a mixture of a vaporized solvent and air. The gas mixture is quickly cooled down to a temperature at least 50° C. below the dew point of the mixture with respect to the solvent, which means the temperature at which the air is saturated with the solvent. The gas is now directed against the filter, where the liquid particles of hydrocarbons and/or hydrocarbon derivatives are adhered to the lipophilic surfaces.

The following table shows the dew point for mixtures of air and a number of different solvents occuring at different concentrations.

| SUBSTANCE | DEWPOINT, ° C at a concentration in air of | | | | |
|---|---|---|---|---|---|
| | 1% | 2% | 5% | 10% | 20% |
| Trichloroethylene, $C_2HCl_3$ | −16 | −4.8 | +11.9 | +26 | +42 |
| benzene, $C_6H_6$ | −20 | −9.8 | +6.6 | +20.5 | +36 |
| Carbontetrachloride, $CCl_4$ | −24 | −13 | +2.7 | +16 | +31 |
| Heptane, $C_7H_{16}$ | −8.5 | +2.7 | +19 | +32 | +48 |
| Toluene, $C_7H_8$ | +1.8 | +13 | +30 | +44 | +60 |

At a rather intense cooling the major part of the solvent will appear in the condensed form as droplets. The minor part being in the gaseous phase is going through the filter and can, if desirable, be collected on activated carbon. Such a combination of filters is especially useful as the activated carbon filter only will receive a very small amount of solvent and so will thereby retain its state of activity for a longer period.

The gas mixture is preferably cooled by having it pass between cooled surfaces, e.g. through tubes cooled on the outside by the cooling medium from a cooling machine. The gas mixture should pass the cooler with very high velocity so that condensed droplets on the cooler surfaces are brought into the air stream again.

At the described adsorption on the lipofil surfaces at a low temperature it has been found that a certain amount of the adsorbed substance is revaporized. In order to prevent this it should be possible to cool even the filter itself by extending cooling tubes in it.

Water vapor or water fog is not adsorbed in the filter but passes straight through it as the filter medium is not wetted by water. Therefore the filter is not blocked by collected water. If, accidentally, a pore is clogged by a water droplet this is easily blown away again by the air stream, as the water droplet, contrary to the hydrocarbon droplet, is not (adsorbed on) lipophile surface. In treating an aerosol which contains water vapor we prefer to work at a temperature above 0° C. At a lower temperature there is a certain risk that ice crystals will clog the filter, especially if it is of the continuous type.

DETAILED DESCRIPTION OF THE PREFERRED EMBODIMENTS

The present invention is now described with reference to the attached FIGS. 1 to 3, showing different embodiments of the invention.

The apparatus according to FIG. 1 is meant to be used for removing droplets of oil out of an oil fog. It consists of a cylindrical container 1 with a conical bottom 5, a cylindrical dividing wall 2, and a tubular filter 3 with a closed bottom. The filter consists of two cylindrical, coaxial wire-meshes, in between which grains of magnetite on the order of 1–2 mm and made lipophilic by treatment with pine oil are enclosed. The conical bottom 5 is connected to a container 6 which has an exhaust tube 7 with a valve. The filter 3 is at the top connected to an inlet tube 4 where the oil fog enters the system. The container 1 is at the top equipped with an exhaust tube 8.

Oil mist is let in via tube 4 and is streaming through the filter 3, where the oil droplets are adsorbed on the lipophilic filter material. The purified air is moved in the direction of the arrows and leaves the apparatus at 8. When a sufficient quantity of oil is adsorbed in the filter pores, the oil starts to flow down the filter and along the outer walls thereof, and is collected in the container 6. The pores of the filter are of such a dimension that they will never become clogged by the oil, and the apparatus can therefor be run continuously.

The apparatus according to FIG. 2 is also meant for use with oil mist. A cylindrical container 11 with a conical bottom 12 contains a filter cage 15 which at the top is equipped with an inlet tubing 16 and at the bottom is equipped with a filter 17. The filter 17 consists of two parallel circular wire meshes encapsulating the granular magnetite mineral with a particle size of 1–2 mm and with a coating of a lipophilic surface of pine oil. The container 11 is equipped with an exhaust tube 18 for the purified gas, and is at the bottom equipped with a collecting tank 13 for collecting the oil, which is drained through a tube 14 equipped with a valve.

The apparatus according to FIG. 3 includes a cylindrical container 21 which is equipped with a wire mesh top 23 and a wire mesh bottom 24 between which is situated the filter medium 22 consisting of magnetite mineral with a grain size of 1–2 mm which has been made lipophilic by treating it with pine oil. The container 21 is at the top connected via a fan 25 to the exhaust tube 26 for the purified gas. At the bottom the container 21 is connected to a collecting tank 27 from which the collected fluid can be drained through a pipe 28 equipped with a valve. The inlet tubing 31, for the gas to be purified, is connected to the lower part of container 21 via a cooler 29. This contains cooling tubes 30 in which circulates a cooling medium from a cooling machine 32. The cooler cools the incoming mixture of gases so that the major part of the organic substance is brought into the form of droplets. The droplets are adsorbed in the filter medium 22, the organic fluid flows down into container 27, and the purified gas is ejected through pipe 26. The purified, cool gas can now be used to cool down the incoming mixture of gases.

EXAMPLE

In an apparatus of the kind shown in FIG. 2 the filter had a diameter of 200 mm and a thickness of 30 mm. Grains of magnetite of the size 1.2–1.7 mm were treated with pine oil. The gas stream directed through the apparatus at a flow rate of 1 $m^3$/h. The gas stream consisted of an oil mist of the kind which is used for lubricating machines, and contained 60 $cm^3$ of oil per $m^3$ air. The filter was used at a temperature of 25° C., and caused a pressure drop of 60 mm WG. In the effluent airstream no traces of oil mist could be detected.

We claim:
1. A method of recovering liquid aerosol particles of hydrocarbons or hydrocarbon derivatives from a gas in which they are suspended, comprising the steps of
   providing a bed of crystalline material in form of grains having a size of about 0.5–2.0 mm;
   coating said grains with a lipophilic substance to provide them with lipophilic surfaces; and directing the gas with the therein suspended particles against the coated grains, and passing the gas through the bed of coated grains so as to recover the hydrocarbon or hydrocarbon derivatives from the gas by adsorption of said particles on said lipophilic surface.

2. A method as defined in claim 1; and further comprising the step of cooling the gas prior to passing it through the bed of coated grains so as to condense the hydrocarbons or derivatives and convert them into said particles.

3. A method as defined in claim 1, wherein the material is quartz sand, and the lipophilic substance is a long-chained amine.

4. A method as defined in claim 1, wherein the material is iron pyrites, and the lipophilic substance is a xanthate.

5. A method as defined in claim 1, wherein the material is glass, and the lipophilic substance comprises a wetting agent.

6. A method as defined in claim 1, wherein the grains have a size range wherein the smallest grains are less than 0.3 mm smaller than the largest grains.

7. A method as defined in claim 1, wherein the step of coating comprises chemisorbing the lipophilic substance on the surface of said grains.

8. A method of recovering liquid aerosol particles of hydrocarbons or hydrocarbon derivatives from a gas in which they are suspended, comprising the steps of
   providing a polymeric material in form of grains having a size of about 0.5–2.0 mm;
   coating said grains with a lipophilic substance to provide them with lipophilic surfaces; and
   passing the gas through the bed of coated grains to recover the hydrocarbons or derivatives thereof from the gas by adsorption of said particles on said lipophilic surfaces.

9. An apparatus for recovering liquid aerosol particles of hydrocarbons or hydrocarbon derivatives from a gas in which they are suspended, comprising
   a container having a gas inlet and a gas outlet;
   a bed of particulate material, positioned between said gas inlet and said gas outlet the particles of which are provided with a surface-coating of a lipophilic substance;
   means for passing through said bed a flow of gas having liquid aerosol particles of hydrocarbons or hydrocarbon derivatives suspended therein, so that such hydrocarbons or hydrocarbon derivatives are progressively adsorbed onto said lipophilic surfaces and begin to run off the same under the influence of gravity when a predetermined degree of adsorption has been attained; and
   means for collecting the thus recovered hydrocarbons or hydrocarbon derivatives after they run off the lipophilic surfaces.

* * * * *